US012667898B2

(12) United States Patent
Wu et al.

(10) Patent No.: US 12,667,898 B2
(45) Date of Patent: Jun. 30, 2026

(54) ELECTRODE WIRE FOR ELECTRICAL DISCHARGE MACHINING AND PREPARATION METHOD THEREOF

(71) Applicant: Ningbo Bode Hightech Co., Ltd., Ningbo (CN)

(72) Inventors: Tong Wu, Ningbo (CN); Xiaoqi Luo, Ningbo (CN); Zhining Liang, Ningbo (CN); Huogen Lin, Ningbo (CN); Yibo Chen, Ningbo (CN)

(73) Assignee: NINGBO BOWAY ALLOY HIGHTECH WIRE CO. LTD, Ningbo (CN)

( * ) Notice: Subject to any disclaimer, the term of this patent is extended or adjusted under 35 U.S.C. 154(b) by 984 days.

(21) Appl. No.: 17/858,955

(22) Filed: Jul. 6, 2022

(65) Prior Publication Data

US 2023/0121719 A1     Apr. 20, 2023

(30) Foreign Application Priority Data

Oct. 18, 2021   (CN) .......................... 202111210891.X

(51) Int. Cl.
| | |
|---|---|
| *B23H 1/06* | (2006.01) |
| *B23H 7/08* | (2006.01) |
| *C25D 3/22* | (2006.01) |
| *C25D 3/38* | (2006.01) |

(52) U.S. Cl.
CPC ................ *B23H 1/06* (2013.01); *B23H 7/08* (2013.01); *C25D 3/22* (2013.01); *C25D 3/38* (2013.01)

(58) Field of Classification Search
CPC ... B23H 1/06; B23H 7/08; B23H 7/24; B23H 11/00; C25D 3/22; C25D 5/625; C25D 5/611; C25D 3/38
See application file for complete search history.

(56) References Cited

U.S. PATENT DOCUMENTS

| | | | | |
|---|---|---|---|---|
| 6,495,788 | B1 | 12/2002 | Chiriotti et al. | |
| 8,067,689 | B2 * | 11/2011 | Tomalin | B32B 15/01 174/36 |
| 8,338,735 | B2 * | 12/2012 | Ly | B23H 7/08 219/69.15 |
| 11,511,362 | B2 * | 11/2022 | Daigle | B23H 1/06 |
| 2003/0057189 | A1 | 3/2003 | Groos et al. | |
| 2008/0061038 | A1 * | 3/2008 | Blanc | B23H 7/08 148/684 |
| 2021/0197301 | A1 * | 7/2021 | Ly | B21C 37/042 |
| 2022/0258262 | A1 * | 8/2022 | Lin | C25D 7/0607 |

FOREIGN PATENT DOCUMENTS

| | | |
|---|---|---|
| CN | 102784978 A | 11/2012 |
| CN | 103273150 A | 9/2013 |
| CN | 103537768 A | 1/2014 |
| CN | 105834533 A | 8/2016 |

* cited by examiner

*Primary Examiner* — Brian W Jennison
(74) *Attorney, Agent, or Firm* — MATTHIAS SCHOLL P.C.; Matthias Scholl

(57) ABSTRACT

An electrode wire includes a brass core, a Cu—Zn alloy layer coated on the brass core, and a surface layer. The surface layer includes CuO, ZnO, $Cu_2(OH)_2CO_3$, and a Cu—Zn intermetallic compound. The surface layer is in the shape of particles or sheets spaced apart on the Cu—Zn alloy layer; and the Cu—Zn alloy layer is exposed with respect to spaces between the particles or sheets.

7 Claims, 4 Drawing Sheets

ELECTRODE WIRE FOR ELECTRICAL DISCHARGE MACHINING AND PREPARATION METHOD THEREOF

CROSS-REFERENCE TO RELATED APPLICATIONS

Pursuant to 35 U.S.C.§ 119 and the Paris Convention Treaty, this application claims foreign priority to Chinese Patent Application No. 202111210891.X filed Oct. 18, 2021, the contents of which, including any intervening amendments thereto, are incorporated herein by reference. Inquiries from the public to applicants or assignees concerning this document or the related applications should be directed to: Matthias Scholl P. C., Attn.: Dr. Matthias Scholl Esq., 245 First Street, 18th Floor, Cambridge, Mass. 02142.

BACKGROUND

The disclosure relates to the field of electrical discharge machining, and more particularly, to an electrode wire for electrical discharge machining and a preparation method thereof.

Electrical discharge machining (EDM) is a manufacturing process whereby electric spark is continuously generated between electrodes to ablate an electrode material.

Wire cut electrical discharge machining (WEDM) is a common type of EDM process. WEDM includes high-speed wire cut electrical discharge machining and slow-speed wire cut electrical discharge machining according to the material and moving direction of an electrode wire. The high-speed wire cut electrical discharge machining typically uses a molybdenum wire with a high melting point to move in a reciprocating way; although the process is cost-effective, the molybdenum wire loses a lot owing to repeated use, reducing the machining accuracy and surface finish of the workpiece. The slow-speed wire cut electrical discharge machining uses copper or copper alloy as an electrode wire that moves directionally, which is costly compared to high-speed wire cut electrical discharge machining.

The brass electrode wire is widely used for slow-speed wire cut electrical discharge machining. It is cheap and operates at low cutting speeds and provides poor processing accuracy and surface finish of the workpiece. As a result, a galvanized electrode wire is developed.

Some galvanized electrodes are made of pure zinc or a high content zinc; the zinc coating is smooth, thin, stable in electric discharge during finishing process, but it is not resistant to EDM erosion, is easy to fall off, and operates at low cutting speeds.

SUMMARY

The first objective of the disclosure is to provide an electrode wire that operates at a high cutting speed and can improve the surface finish of a workpiece.

The electrode wire comprises a brass core, a Cu—Zn alloy layer coated on the brass core, and a surface layer. The surface layer comprises CuO, ZnO, $Cu_2(OH)_2CO_3$, and a Cu—Zn intermetallic compound. The surface layer is in the shape of particles or sheets spaced apart on the Cu—Zn alloy layer; and the Cu—Zn alloy layer is exposed with respect to spaces between the particles or sheets.

The following advantages are associated with the electrode wire of the disclosure:

During a wire cut EDM process, the cutting speed varies with a discharging time, an electric current, a melting point and a boiling point of an electric spark. The longer the discharge time, the longer the duration of the electric spark and the larger the corrosion pit; the smaller the discharge interval, the higher the discharge frequency, and the more the number of corrosion pits in the same time; the greater the current during discharge, the more heat generated by the electric spark and the larger the corrosion pit; all these make the cutting speed faster. Furthermore, the cutting speed is affected by the properties of the material of both the workpiece and the electrode wire. The spark is easy to ablate a workpiece or an electrode wire having a low melting point or boiling point, resulting in massive and deep corrosion pits in the workpiece or the electrode wire; when the electrode wire evaporates, a vapor pressure is generated and flushes molten melt from the corrosion pits to the liquid insulating medium.

The thermal conductivity of the electrode material is also a factor that affects the formation of the corrosion pits; the spark-generated heat is easily concentrated on the local surface of the material having a low thermal conductivity, and a high vapor pressure is produced, improving the rinsing effect and increasing the cutting speed.

Under the same EDM conditions and cutting materials of a machining tool, to improve the cutting speed and the surface finish of the workpiece, the electrode wire is a reference variable.

A conventional electrode wire typically includes a brass core coated with a zinc coating comprising zinc or alloys of copper and zinc; at room temperature, brass such as $CuZn_{37}$ has a thermal conductivity of 116.7 W·(m·K)−1; zinc has a thermal conductivity of 116 W·(m·K)−1; and copper has a thermal conductivity of 386.4 W·(m·K)−1. The electrode wire of the disclosure comprises the surface layer comprising CuO or ZnO which has a lower thermal conductivity than the material of the conventional electrode wire; at room temperature, CuO has a thermal conductivity of 32.6 W·(m·K)−1; and ZnO has a thermal conductivity of 29.98 W·(m·K)−1; and the thermal conductivity of ZnO is decreased at high temperatures. Therefore, the spark-generated heat is concentrated on the surface of the electrode wire of the disclosure, which causes CuO, ZnO, $Cu_2(OH)_2CO_3$, and the Cu—Zn intermetallic compound in the surface layer to evaporate or decompose, thus causing an increase in the vapor pressure for a rinsing effect. The surface layer is in the shape of the sheets or particles spaced apart on the brass core so as to achieve a continuous rinsing effect during the wire cut EDM process.

The surface of the workpiece comprises a plurality of point corrosion pits. During the finishing process, to obtain better surface finish of the workpiece, it is needed to reduce the size of the plurality of point corrosion pits and reduce the cutting speed. CuO, ZnO, $Cu_2(OH)_2CO_3$, and the Cu—Zn intermetallic compound are present in the surface layer, causing the decrease in the conductivity of the surface layer while having no effect on the rough cutting due to high discharge energy. As the finishing process progresses, the discharge energy decreases, causing the surface layer with decreased conductivity thus obstructing the flow of electrons; as a result, the formation of an ionization channel is delayed, shortening the discharge time, forming narrow corrosion pits, and enhancing the surface finish of the workpiece.

The electrode wire offers advantages in cutting speed and surface finish of the workpiece over the conventional electrode wires.

In a class of this embodiment, the surface layer comprises 4%-9.5% by mass of CuO, 44%-55% by mass of ZnO, 2%-10% by mass of $Cu_2(OH)_2CO_3$, and 31%-44.5% by mass of the Cu—Zn intermetallic compound, and thus the conductivity of the surface layer is reduced, improving the surface finish of the workpiece.

In a class of this embodiment, the surface layer comprises a plurality of micropores each having a diameter of 0.01-2 μm; the plurality of micropores increases a contact area between the electrode wire and the liquid insulating medium, which improves a cooling effect, thus increasing the cutting speed of the electrode wire during rough machining.

In a class of this embodiment, 60%-95% of the Cu—Zn alloy layer is covered by the surface layer; and the cutting speed and the surface finish of the workpiece increase as the surface area of the surface layer increases.

In a class of this embodiment, the surface layer has a thickness ranging from 2 μm to 7 μm. The thickness range maintains the conductivity of the electrode wire and forms the ionization channel during a discharge cycle, thus generating an electric spark discharge and improving the surface finish of the workpiece.

In a class of this embodiment, the Cu—Zn alloy layer comprises a β' phase or a β'+γ phase, achieving a continuous rinsing effect and increasing the cutting speed of the electrode wire.

In a class of this embodiment, the Cu—Zn alloy layer has a thickness of 4-10 μm, achieving a continuous rinsing effect and increasing the cutting speed of the electrode wire.

The second objective of the disclosure is to provide a preparation method of the electrode wire through electric charge machining; the electrode wire comprises a brass core, a Cu—Zn alloy layer coated on the brass core, and a surface layer. The surface layer comprises CuO, ZnO, $Cu_2(OH)_2CO_3$, and a Cu—Zn intermetallic compound. The surface layer is in the shape of particles or sheets spaced apart on the Cu—Zn alloy layer; and the Cu—Zn alloy layer is exposed with respect to spaces between the particles or sheets. The electrode wire can operate at a high cutting speed and improve the surface finish of the workpiece.

The preparation method of the electrode wire comprises:

1) preparing a brass core having a diameter of 0.6-0.9 mm;

2) placing the brass core in an electroplating solution comprising saccharide, and forming a zinc coating on the brass core obtained in 1) through an electroplating process; during the electroplating process, the saccharide absorbs zinc ions and slows down a cathodic reduction reaction of the zinc ions, slows down a crystallization rate of the zinc coating and refines crystalline grains of the zinc coating, to form a compact, hard, and brittle zinc coating containing the saccharide on the brass core thus yielding a first billet; a concentration of the saccharide is 8-25 g/L; an electrodeposition rate is 200-400 m/min; an electric current is 965-1350 A; an electric voltage is 5.2-7 V; and the zinc coating has a thickness of 4.5-9μ;

3) stretching, using a wire drawing die, the first billet to a diameter of 0.47-0.62 mm, so that the zinc coating cracks in a direction perpendicular to an axis of the first billet or at an acute angle of greater than 30 degrees with respect to the axis of the first billet, to yield a second billet comprising the zinc coating with a plurality of cracks;

4) continuously blowing air to a furnace and heating the second billet in the furnace at 200-400° C. for 2-10 hours; cooling the furnace to less than 150° C. and taking the second billet out of the furnace, thus obtaining a third billet comprising the Cu—Zn alloy layer and the surface layer comprising a plurality of cracks; and 5) stretching, using the wire drawing die, the third billet to a diameter of 0.15-0.3 mm, to yield an electrode wire comprising the Cu—Zn alloy layer and the surface layer, wherein the surface layer is in the shape of particles or sheets spaced apart on the Cu—Zn alloy layer, and the Cu—Zn alloy layer is exposed with respect to spaces between the particles or sheets.

The electrode wire in 5) comprises the brass core, the Cu—Zn alloy layer coated on the brass core, and the surface layer; the surface layer is in the shape of sheets or particles spaced apart on the surface of the Cu—Zn alloy layer; the Cu—Zn alloy layer is exposed with respect to the spaces between the sheets or particles; and the surface layer comprises CuO, ZnO, $Cu_2(OH)_2CO_3$, and the Cu—Zn intermetallic compound.

The electrode wire prepared by the above method has a low gasification point. When the electrode wire is ablated, it is easier to vaporize and generate a higher gasification pressure, so that the molten metal material in the corrosion pit is easily flushed into the liquid insulation medium. The thermal conductivity of the electrode wire is low, so that the heat generated by the electric spark is more concentrated on the surface of the electrode wire, and the electrode surface material generates a stronger gasification pressure when being vaporized, thus improving the washing effect and cutting speed. The surface layer comprises CuO, ZnO, $Cu_2(OH)_2CO_3$, and the Cu—Zn intermetallic compound, which decreases the conductivity of the surface layer while has no effect on the rough cutting process because the discharge energy is extremely high. As the finishing process progresses, the discharge energy decreases, and the surface layer with decreased conductivity further obstructs the flow of the electrons; as a result, the formation of an ionization channel is delayed, shortening the discharge time, forming narrow corrosion pits, thus enhancing the surface finish of the workpiece. Therefore, the electrode wire of the disclosure operates at a high cutting speed and improves the surface finish of the workpiece.

In a class of this embodiment, the saccharide comprises at least one selected from the group consisting of sucrose, lactose and maltose; in 2), the zinc coating achieves greater density and hardness so that CuO, ZnO, $Cu_2(OH)_2CO_3$, and the Cu—Zn intermetallic compound are retained in the surface layer.

In a class of this embodiment, the stretch ratio of the first billet in 3) is 35%-65%; and the stretch ratio of the third billet in 5) is 55%-95%. The first billet is stretched, so that the zinc coating cracks in a direction perpendicular to an axis of the first billet or at an acute angle of greater than 30 degrees with respect to the axis of the first billet; and the surface layer, comprising the plurality of sheets and particles, meets the requirements of the cutting speed and the surface finish of the workpiece. Understandably, the term "an acute angle of greater than 30°" refers to an acute angle of between 30° and 90°.

DETAILED DESCRIPTION OF DRAWINGS

1. Crack; 2. Brass core; 3. Zinc coating; 4. Surface layer; 5. Cu—Zn alloy layer; and 6. Micropore.

DETAILED DESCRIPTION

To further illustrate, embodiments detailing an electrode wire for electrical discharge machining and a preparation method thereof are described below. It should be noted that the following embodiments are intended to describe and not to limit the disclosure.

Figure 1:
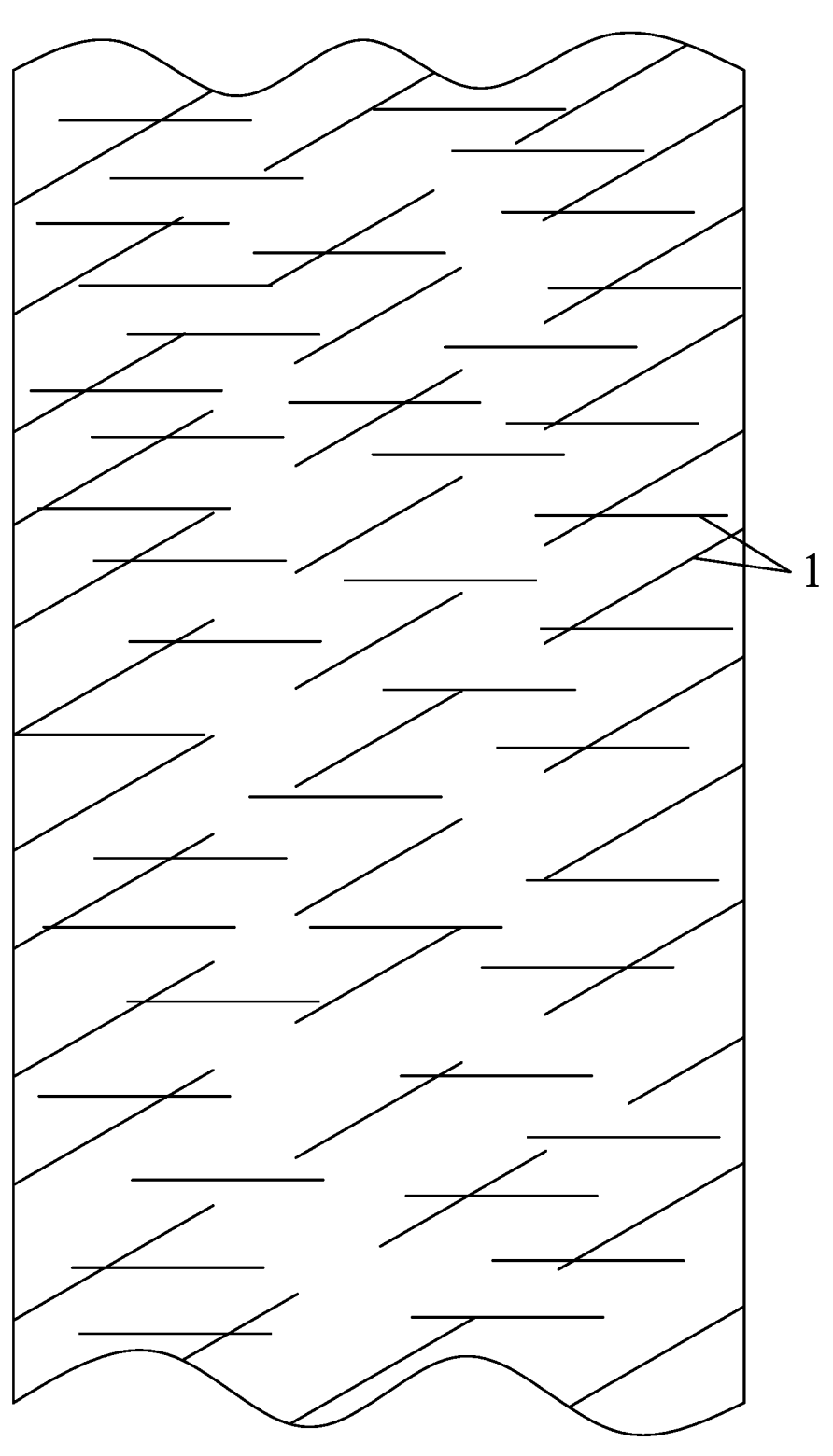
FIG. 1 is a perspective view of a first billet of the disclosure.
Figure 2:
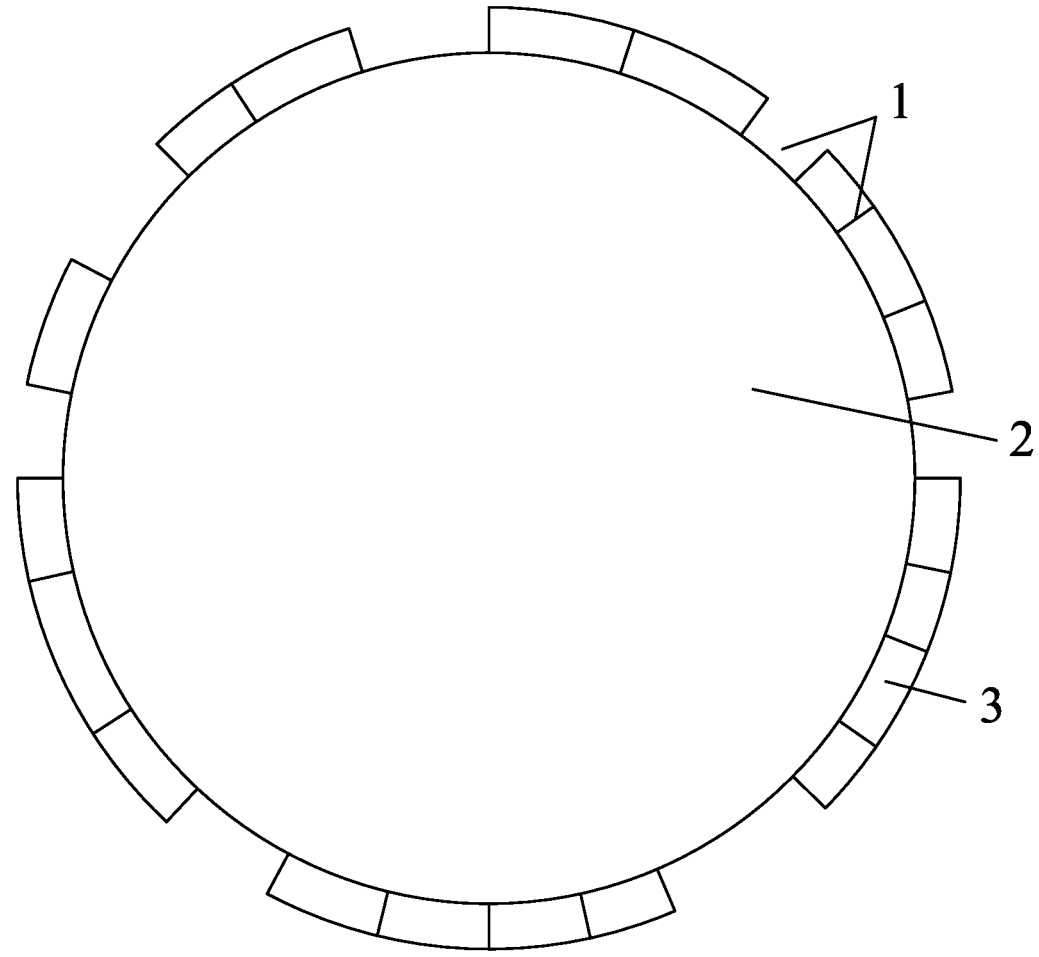
FIG. 2 is a cross-sectional view of a first billet of the disclosure.
Figure 3:
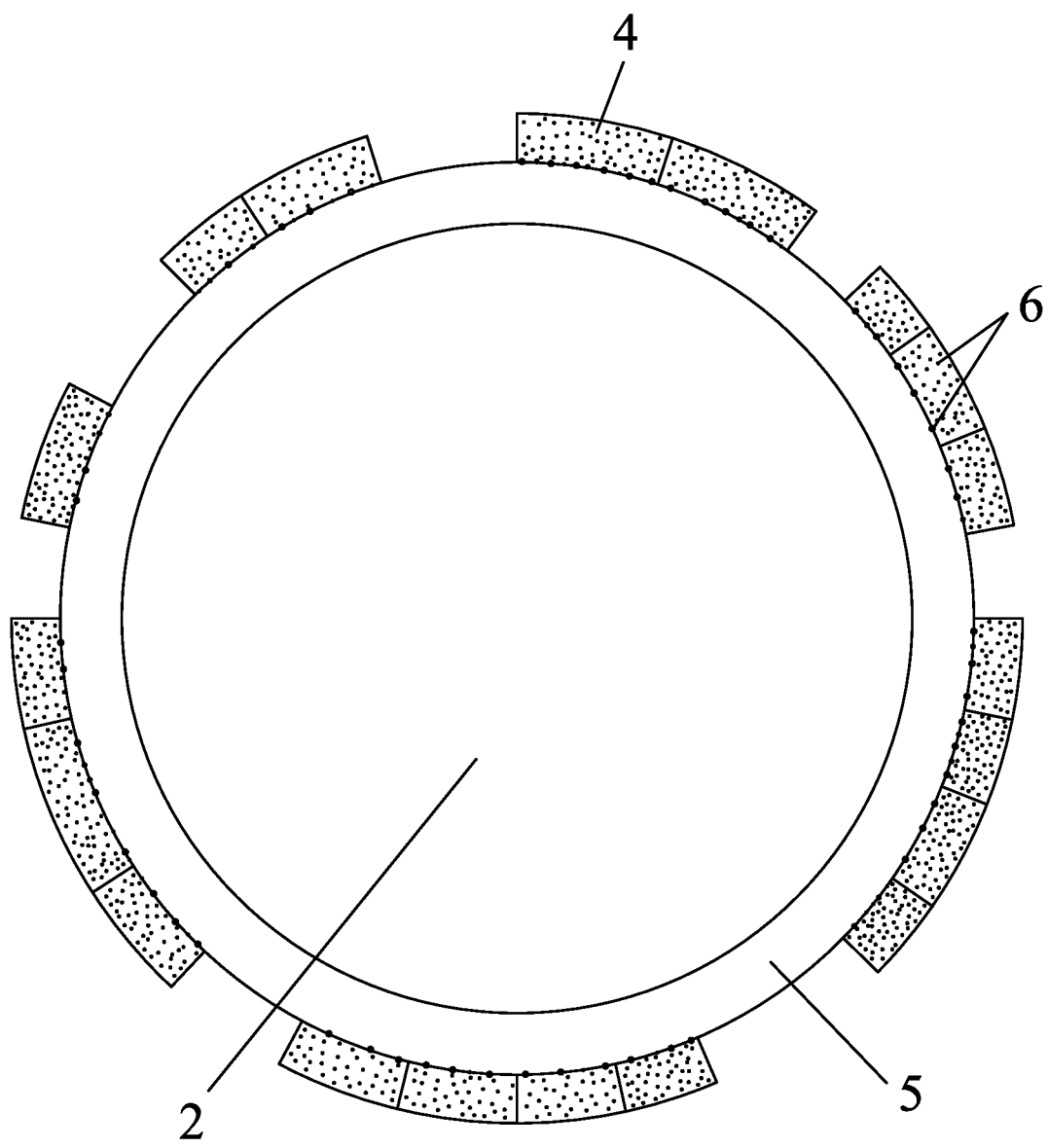
FIG. 3 is a cross-sectional view of a third billet of the disclosure.
Figure 4:
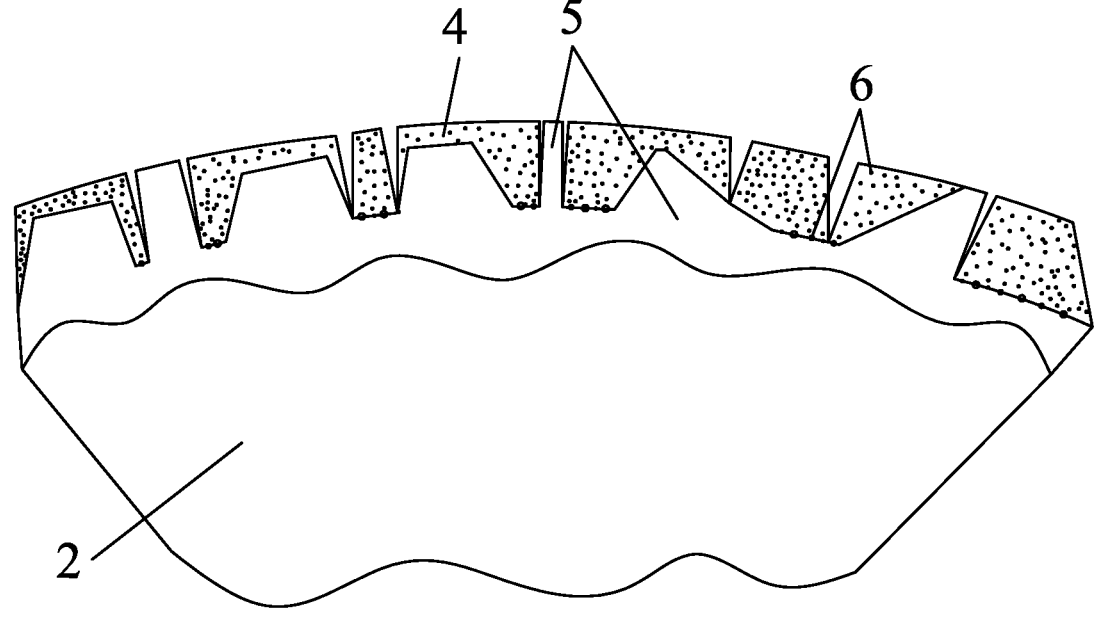
FIG. 4 is a cross-sectional view of an electrode wire of the disclosure.

Referring to FIGS. 1, 2, 3, and 4, following specific details are provided to give a thorough understanding of the structure, components, and working principle of the electrode wire as described in the specification and illustrated in the accompanying drawings.

As used herein, the term "brass core" refers to a metal core comprising $CuZn_{37}$ or $CuZn_{40}$.

As used herein, the term "a plurality of sheets" also refers to a plurality of blocks spaced apart on the surface of the electrode wire.

CuO represents copper oxide; ZnO represents zinc oxide; and $Cu_2(OH)_2CO_3$ represents basic copper carbonate.

The first billet comprises a zinc coating 3 with a plurality of cracks 1; and the following advantages are associated with the design features: a conventional electrode wire typically includes a saccharide-free zinc coating having great ductility and plastic toughness; when the brass core is stretched by the wire drawing die, the saccharide-free zinc coating becomes uniformly thin without formation of cracks. A conventional process of electroplating typically uses boric acid and aluminum sulfate as used as pH buffers and uses ammonium chloride as a conductive salt, all of which are not saccharides. On the contrary, the electroplating process of the disclosure uses saccharides to absorb zinc ions and slow down a cathodic reduction reaction of the zinc ions, thus increasing cathodic polarization; and the zinc coating crystallizes slowly, which facilitates the formation of fine crystals, thus forming a dense, hard, and brittle zinc coating. The saccharides absorbed in the zinc coating increase internal stress, making the zinc coating harder and more brittle. Therefore, the zinc coating cracks when stretched and squeezed by the drawing die; and a plurality of cracks 1 are formed in a direction perpendicular to an axis of the electrode wire or at an angle of greater than 30 degrees with respect to the axis of the electrode wire; that is, the plurality of cracks 1 comprises a plurality of transverse cracks and diagonal cracks.

The electro crystallization process involves two stages including crystal nucleation and crystal growth. The size of the crystals is affected by the rate of electro crystallization at each stage. When the crystals nucleate faster than they grow, a dense and tightly packed zinc coating is formed. An electrode reaction stops or slows when adsorption occurs on localized sites on the surface of an electrode during the electroplating process. Understandably, a decrease in effective area of the electrode causes a high current density across the electrode, thus enhancing the polarization effect. When adsorption occurs on the entire surface of the electrode, an adsorbed layer is formed and blocks the electron to flow through, thus slowing down the electrode reaction and enhancing the polarization effect. Understandably, the term "electrode" as used herein refers to the brass core in 1). The method of the disclosure increases the cathodic polarization so as to increase the rate of crystal nucleation, thus obtaining the zinc coating with high-density crystals. The zinc coating cracks when stretched and squeezed by the drawing die.

Preferably, the saccharide comprises at least one selected from the group consisting of sucrose, lactose and maltose.

The surface layer 4 comprises a plurality of micropores 6. As the electroplating process progresses, the zinc coating 3 thickens and the metal crystallizes and grows; as a result, the saccharides are uniformly adsorbed on the zinc coating 3 and decompose at high temperatures to form the plurality of micropores 6. The micropores 6 in the surface layer 4 are small and narrow in comparison with the micropores 6 formed on the contact area between the surface layer 4 and the Cu—Zn alloy layer 5.

At the beginning of the electroplating process, the saccharides are absorbed on the surface of the brass core 2, especially at the surface defects. The Cu—Zn alloy layer 5 and the surface layer 4 are formed on the brass core after the first stretching and heat treatment; during the heat treatment, the saccharides at the surface defects decompose at high temperatures, so that the widen micropores 6 are unevenly formed on the contact area between the Cu—Zn alloy layer 5 and the surface layer 4; and the surface layer 4 is also known as a cladding layer.

Example 1

A preparation method of the electrode wire, comprising:

1) preparing a brass core comprising $CuZn_{37}$ having a diameter of 0.82 mm;

2) placing the brass core in an electroplating solution comprising saccharide, and forming a zinc coating on the brass core obtained in 1) through an electroplating process; the saccharide comprises at least one selected from the group consisting of sucrose, lactose and maltose; the thickness of the zinc coating is 6.8 μm; the concentration of the saccharide is 25 g/L; the electrodeposition rate is 240 m/min; the electric current is 1200 A; and the electric voltage is 6.2 V.

The formula of the electroplating solution is a conventional one, such as 450-550 g/L zinc sulfate. The following examples 2-15 are the same. For brevity, the following examples 2-15 will not be repeated. The disclosure uses saccharides as an organic additive (the concentration of the saccharides in this example is 25 g/L).

3) Stretching, using a wire drawing die, the first billet to a diameter of 0.6 mm, so that the zinc coating cracks in a direction perpendicular to the axis of the first billet or at an acute angle of greater than 30 degrees with respect to the axis of the first billet, to yield a second billet comprising the zinc coating with a plurality of cracks.

4) Continuously blowing air to a furnace and heating the second billet in the furnace at 400° C. for 6 hours; cooling the furnace to less than 150° C. and taking the second billet out of the furnace, thus obtaining a third billet comprising an Cu—Zn alloy layer and the zinc coating comprising a plurality of cracks.

The working principle of the heat treatment in 4) is detailed as follows: brass is a combination of copper with zinc. The copper and the zinc coating are heated and fused together to form the Cu—Zn alloy layer with a low content of copper. Since the zinc coating prevents the passage of oxygen, the saccharide decomposes into carbon and water ($H_2O$), forming the plurality of micropores in the zinc coating. Oxygen in the air flows through the plurality of micropores into the zinc coating, combines with carbon to form $CO_2$, and reacts with copper and zinc to form CuO and ZnO, respectively. The plurality of micropores acts as a barrier that prevents the copper in the brass core from diffusing into the zinc coating, thus separating the Cu—Zn alloy layer from the surface layer. The micropores in the surface layer is small and narrow in comparison with the micropores on the contact area between the surface layer and the Cu—Zn alloy layer.

Because Cu element cannot diffuse from the brass core into the surface layer, the heat treatment combines Cu and Zn elements to form a Cu—Zn intermetallic compound in an area far from the micropores in the surface layer. Since no micropores is formed in the Cu—Zn alloy layer, the copper and zinc elements easily diffuse with the brass core to form a stable $\beta'$ phase or a $\beta'+\gamma$ phase. Understandably, the $\beta$ phase is a high-temperature phase and the $\beta'$ phase is a low-temperature phase of the $\beta$ phase; the $\beta$ phase and the $\beta'$ phase transition into one another when the temperature changes. During the cooling process, a portion of copper in the surface layer reacts with $O_2$, $CO_2$, and $H_2O$ in the surrounding environment to form CuO and $Cu_2(OH)_2CO_3$, resulting in the third billet comprising the Cu—Zn alloy layer and the zinc coating. The heat treatment principle and process described in the above two paragraphs are the same as those in the following examples 2-15. For brevity, the following examples 2-15 will not be repeated.

5) Stretching, using the wire drawing die, the third billet to a diameter of 0.25 mm, to yield an electrode wire comprising the surface layer and the Cu—Zn alloy layer; the surface layer is in the shape of sheets or particles spaced apart on the Cu—Zn alloy layer; 77% of the Cu—Zn alloy layer is covered by the surface layer; the thickness of the surface layer is 4 μm; each of the plurality of micropores (including micropores in the surface layer and micropores on the contact area between the surface layer and the Cu—Zn alloy layer; for brevity, the following examples 2-15 will not be repeated) is 0.078-1.8 μm in diameter; the surface layer comprises 4.3% by mass of CuO, 53.8% by mass of ZnO, 9.3% by mass of $Cu_2(OH)_2CO_3$, and 32.6% by mass of the Cu—Zn intermetallic compound; and the Cu—Zn alloy layer has a thickness of 8 μm and comprises a $\beta'$ phase.

Example 2

A preparation method of the electrode wire, comprising:

1) preparing a brass core comprising $CuZn_{40}$ having a diameter of 0.9 mm;

2) placing the brass core in an electroplating solution comprising saccharide, and forming a zinc coating on the brass core obtained in 1) through an electroplating process; the saccharide comprises at least one selected from the group consisting of sucrose, lactose and maltose; the thickness of the zinc coating is 9 μm; the concentration of the saccharide is 28 g/L; the electrodeposition rate is 200 m/min; the electric current is 1350 A; and the electric voltage is 7 V.

3) Stretching, using a wire drawing die, the first billet to a diameter of 0.62 mm, so that the zinc coating cracks in a direction perpendicular to the axis of the first billet or at an acute angle of greater than 30 degrees with respect to the axis of the first billet, to yield a second billet comprising the zinc coating with a plurality of cracks.

4) Continuously blowing air to a furnace and heating the second billet in the furnace at 400° C. for 10 hours; cooling the furnace to less than 150° C. and taking the second billet out of the furnace, thus obtaining a third billet comprising an Cu—Zn alloy layer and the zinc coating comprising a plurality of cracks.

5) Stretching, using the wire drawing die, the third billet to a diameter of 0.25 mm, to yield an electrode wire comprising the surface layer and the Cu—Zn alloy layer; the surface layer is in the shape of sheets or particles spaced apart on the Cu—Zn alloy layer; 80% of the Cu—Zn alloy layer is covered by the surface layer; the thickness of the surface layer is 7 μm; each of the plurality of micropores (including micropores in the surface layer and micropores on the contact area between the surface layer and the Cu—Zn alloy layer; for brevity, the following examples 2-15 will not be repeated) is 0.080-2.8 μm in diameter; the surface layer comprises 4% by mass of CuO, 55% by mass of ZnO, 10% by mass of $Cu_2(OH)_2CO_3$, and 31% by mass of the Cu—Zn intermetallic compound; and the Cu—Zn alloy layer has a thickness of 10 μm and comprises a $\beta'$ phase.

Example 3

A preparation method of the electrode wire, comprising:

1) preparing a brass core comprising $CuZn_{37}$ having a diameter of 0.8 mm;

2) placing the brass core in an electroplating solution comprising saccharide, and forming a zinc coating on the brass core obtained in 1) through an electroplating process; the saccharide comprises at least one selected from the group consisting of sucrose, lactose and maltose; the thickness of the zinc coating is 6.5 μm; the concentration of the saccharide is 22 g/L; the electrodeposition rate is 250 m/min; the electric current is 1150 A; and the electric voltage is 6.5 V.

3) Stretching, using a wire drawing die, the first billet to a diameter of 0.6 mm, so that the zinc coating cracks in a direction perpendicular to the axis of the first billet or at an acute angle of greater than 30 degrees with respect to the axis of the first billet, to yield a second billet comprising the zinc coating with a plurality of cracks.

4) Continuously blowing air to a furnace and heating the second billet in the furnace at 320° C. for 3.5 hours; cooling the furnace to less than 150° C. and taking the second billet out of the furnace, thus obtaining a third billet comprising an Cu—Zn alloy layer and the zinc coating comprising a plurality of cracks.

5) Stretching, using the wire drawing die, the third billet to a diameter of 0.25 mm, to yield an electrode wire comprising the surface layer and the Cu—Zn alloy layer; the surface layer is in the shape of sheets or particles spaced apart on the Cu—Zn alloy layer; 78% of the Cu—Zn alloy layer is covered by the surface layer; the thickness of the surface layer is 3 μm; each of the plurality of micropores (including micropores in the surface layer and micropores on the contact area between the surface layer and the Cu—Zn alloy layer; for brevity, the following examples 2-15 will not be repeated) is 0.035-1.6 μm in diameter; the surface layer comprises 7.2% by mass of CuO, 48.7% by mass of ZnO, 5.1% by mass of $Cu_2(OH)_2CO_3$, and 39% by mass of the Cu—Zn intermetallic compound; and the Cu—Zn alloy layer has a thickness of 6.8 μm and comprises a $\beta'+\gamma$ phase.

Example 4

A preparation method of the electrode wire, comprising:

1) preparing a brass core comprising $CuZn_{37}$ having a diameter of 0.8 mm;

2) placing the brass core in an electroplating solution comprising saccharide, and forming a zinc coating on the brass core obtained in 1) through an electroplating process; the saccharide comprises at least one selected from the group consisting of sucrose, lactose and maltose; the thickness of the zinc coating is 7.8 µm; the concentration of the saccharide is 26 g/L; the electrodeposition rate is 235 m/min; the electric current is 1260 A; and the electric voltage is 6.7 V.

3) Stretching, using a wire drawing die, the first billet to a diameter of 0.61 mm, so that the zinc coating cracks in a direction perpendicular to the axis of the first billet or at an acute angle of greater than 30 degrees with respect to the axis of the first billet, to yield a second billet comprising the zinc coating with a plurality of cracks.

4) Continuously blowing air to a furnace and heating the second billet in the furnace at 350° C. for 10 hours; cooling the furnace to less than 150° C. and taking the second billet out of the furnace, thus obtaining a third billet comprising an Cu—Zn alloy layer and the zinc coating comprising a plurality of cracks.

5) Stretching, using the wire drawing die, the third billet to a diameter of 0.25 mm, to yield an electrode wire comprising the surface layer and the Cu—Zn alloy layer; the surface layer is in the shape of sheets or particles spaced apart on the Cu—Zn alloy layer; 82% of the Cu—Zn alloy layer is covered by the surface layer; the thickness of the surface layer is 5.6 µm; each of the plurality of micropores (including micropores in the surface layer and micropores on the contact area between the surface layer and the Cu—Zn alloy layer; for brevity, the following examples 2-15 will not be repeated) is 0.06-1.75 µm in diameter; the surface layer comprises 5.2% by mass of CuO, 51.8% by mass of ZnO, 7.8% by mass of $Cu_2(OH)_2CO_3$, and 35.2% by mass of the Cu—Zn intermetallic compound; and the Cu—Zn alloy layer has a thickness of 8.3 µm and comprises a β' phase.

Example 5

A preparation method of the electrode wire, comprising:

1) preparing a brass core comprising $CuZn_{37}$ having a diameter of 0.78 mm;

2) placing the brass core in an electroplating solution comprising saccharide, and forming a zinc coating on the brass core obtained in 1) through an electroplating process; the saccharide comprises at least one selected from the group consisting of sucrose, lactose and maltose; the thickness of the zinc coating is 6.3 µm; the concentration of the saccharide is 20 g/L; the electrodeposition rate is 270 m/min; the electric current is 1080 A; and the electric voltage is 5.9 V.

3) Stretching, using a wire drawing die, the first billet to a diameter of 0.6 mm, so that the zinc coating cracks in a direction perpendicular to the axis of the first billet or at an acute angle of greater than 30 degrees with respect to the axis of the first billet, to yield a second billet comprising the zinc coating with a plurality of cracks.

4) Continuously blowing air to a furnace and heating the second billet in the furnace at 370° C. for 5 hours; cooling the furnace to less than 150° C. and taking the second billet out of the furnace, thus obtaining a third billet comprising an Cu—Zn alloy layer and the zinc coating comprising a plurality of cracks.

5) Stretching, using the wire drawing die, the third billet to a diameter of 0.25 mm, to yield an electrode wire comprising the surface layer and the Cu—Zn alloy layer; the surface layer is in the shape of sheets or particles spaced apart on the Cu—Zn alloy layer; 85% of the Cu—Zn alloy layer is covered by the surface layer; the thickness of the surface layer is 3.5 µm; each of the plurality of micropores (including micropores in the surface layer and micropores on the contact area between the surface layer and the Cu—Zn alloy layer; for brevity, the following examples 2-15 will not be repeated) is 0.05-1.78 µm in diameter; the surface layer comprises 4.9% by mass of CuO, 52.4% by mass of ZnO, 8.2% by mass of $Cu_2(OH)_2CO_3$, and 34.5% by mass of the Cu—Zn intermetallic compound; and the Cu—Zn alloy layer has a thickness of 6.3 µm and comprises a β' phase.

Example 6

A preparation method of the electrode wire, comprising:

1) preparing a brass core comprising $CuZn_{37}$ having a diameter of 0.76 mm;

2) placing the brass core in an electroplating solution comprising saccharide, and forming a zinc coating on the brass core obtained in 1) through an electroplating process; the saccharide comprises at least one selected from the group consisting of sucrose, lactose and maltose; the thickness of the zinc coating is 6.1 µm; the concentration of the saccharide is 24 g/L; the electrodeposition rate is 275 m/min; the electric current is 1090 A; and the electric voltage is 6 V.

3) Stretching, using a wire drawing die, the first billet to a diameter of 0.57 mm, so that the zinc coating cracks in a direction perpendicular to the axis of the first billet or at an acute angle of greater than 30 degrees with respect to the axis of the first billet, to yield a second billet comprising the zinc coating with a plurality of cracks.

4) Continuously blowing air to a furnace and heating the second billet in the furnace at 330° C. for 3 hours; cooling the furnace to less than 150° C. and taking the second billet out of the furnace, thus obtaining a third billet comprising an Cu—Zn alloy layer and the zinc coating comprising a plurality of cracks.

5) Stretching, using the wire drawing die, the third billet to a diameter of 0.25 mm, to yield an electrode wire comprising the surface layer and the Cu—Zn alloy layer; the surface layer is in the shape of sheets or particles spaced apart on the Cu—Zn alloy layer; 81% of the Cu—Zn alloy layer is covered by the surface layer; the thickness of the surface layer is 3.4 µm; each of the plurality of micropores (including micropores in the surface layer and micropores on the contact area between the surface layer and the Cu—Zn alloy layer; for brevity, the following examples 2-15 will not be repeated) is 0.038-1.65 µm in diameter; the surface layer comprises 6.8% by mass of CuO, 49.6% by mass of ZnO, 5.8% by mass of $Cu_2(OH)_2CO_3$, and 37.8% by mass of the Cu—Zn intermetallic compound; and the Cu—Zn alloy layer has a thickness of 6 µm and comprises a β'+γ phase.

Example 7

A preparation method of the electrode wire, comprising:

1) preparing a brass core comprising $CuZn_{37}$ having a diameter of 0.74 mm;

2) placing the brass core in an electroplating solution comprising saccharide, and forming a zinc coating on the brass core obtained in 1) through an electroplating process; the saccharide comprises at least one selected from the group consisting of sucrose, lactose and maltose; the thickness of the zinc coating is 5.9 µm; the concentration of the saccharide is 18 g/L; the electrodeposition rate is 280 m/min; the electric current is 1030 A; and the electric voltage is 5.8 V.

3) Stretching, using a wire drawing die, the first billet to a diameter of 0.56 mm, so that the zinc coating cracks in a direction perpendicular to the axis of the first billet or at an acute angle of greater than 30 degrees with respect to the axis of the first billet, to yield a second billet comprising the zinc coating with a plurality of cracks.

4) Continuously blowing air to a furnace and heating the second billet in the furnace at 300° C. for 4.5 hours; cooling the furnace to less than 150° C. and taking the second billet out of the furnace, thus obtaining a third billet comprising an Cu—Zn alloy layer and the zinc coating comprising a plurality of cracks.

5) Stretching, using the wire drawing die, the third billet to a diameter of 0.25 mm, to yield an electrode wire comprising the surface layer and the Cu—Zn alloy layer; the surface layer is in the shape of sheets or particles spaced apart on the Cu—Zn alloy layer; 76% of the Cu—Zn alloy layer is covered by the surface layer; the thickness of the surface layer is 2.8 $\mu$m; each of the plurality of micropores (including micropores in the surface layer and micropores on the contact area between the surface layer and the Cu—Zn alloy layer; for brevity, the following examples 2-15 will not be repeated) is 0.024-1.62 $\mu$m in diameter; the surface layer comprises 8% by mass of CuO, 46.9% by mass of ZnO, 4.1% by mass of $Cu_2(OH)_2CO_3$, and 41% by mass of the Cu—Zn intermetallic compound; and the Cu—Zn alloy layer has a thickness of 6.2 $\mu$m and comprises a $\beta'+\gamma$ phase.

Example 8

A preparation method of the electrode wire, comprising:

1) preparing a brass core comprising $CuZn_{37}$ having a diameter of 0.72 mm;

2) placing the brass core in an electroplating solution comprising saccharide, and forming a zinc coating on the brass core obtained in 1) through an electroplating process; the saccharide comprises at least one selected from the group consisting of sucrose, lactose and maltose; the thickness of the zinc coating is 5.8 $\mu$m; the concentration of the saccharide is 16 g/L; the electrodeposition rate is 285 m/min; the electric current is 1020 A; and the electric voltage is 5.75 V.

3) Stretching, using a wire drawing die, the first billet to a diameter of 0.55 mm, so that the zinc coating cracks in a direction perpendicular to the axis of the first billet or at an acute angle of greater than 30 degrees with respect to the axis of the first billet, to yield a second billet comprising the zinc coating with a plurality of cracks.

4) Continuously blowing air to a furnace and heating the second billet in the furnace at 340° C. for 8 hours; cooling the furnace to less than 150° C. and taking the second billet out of the furnace, thus obtaining a third billet comprising an Cu—Zn alloy layer and the zinc coating comprising a plurality of cracks.

5) Stretching, using the wire drawing die, the third billet to a diameter of 0.25 mm, to yield an electrode wire comprising the surface layer and the Cu—Zn alloy layer; the surface layer is in the shape of sheets or particles spaced apart on the Cu—Zn alloy layer; 86% of the Cu—Zn alloy layer is covered by the surface layer; the thickness of the surface layer is 3.2 $\mu$m; each of the plurality of micropores (including micropores in the surface layer and micropores on the contact area between the surface layer and the Cu—Zn alloy layer; for brevity, the following examples 2-15 will not be repeated) is 0.042-1.68 $\mu$m in diameter; the surface layer comprises 5.6% by mass of CuO, 51.5% by mass of ZnO, 7.4% by mass of $Cu_2(OH)_2CO_3$, and 35.5% by mass of the Cu—Zn intermetallic compound; and the Cu—Zn alloy layer has a thickness of 5.9 $\mu$m and comprises a $\beta'$ phase.

Example 9

A preparation method of the electrode wire, comprising:

1) preparing a brass core comprising $CuZn_{40}$ having a diameter of 0.7 mm;

2) placing the brass core in an electroplating solution comprising saccharide, and forming a zinc coating on the brass core obtained in 1) through an electroplating process; the saccharide comprises at least one selected from the group consisting of sucrose, lactose and maltose; the thickness of the zinc coating is 5.5 $\mu$m; the concentration of the saccharide is 15 g/L; the electrodeposition rate is 300 m/min; the electric current is 990 A; and the electric voltage is 5.7 V.

3) Stretching, using a wire drawing die, the first billet to a diameter of 0.53 mm, so that the zinc coating cracks in a direction perpendicular to the axis of the first billet or at an acute angle of greater than 30 degrees with respect to the axis of the first billet, to yield a second billet comprising the zinc coating with a plurality of cracks.

4) Continuously blowing air to a furnace and heating the second billet in the furnace at 285° C. for 5.5 hours; cooling the furnace to less than 150° C. and taking the second billet out of the furnace, thus obtaining a third billet comprising an Cu—Zn alloy layer and the zinc coating comprising a plurality of cracks.

5) Stretching, using the wire drawing die, the third billet to a diameter of 0.25 mm, to yield an electrode wire comprising the surface layer and the Cu—Zn alloy layer; the surface layer is in the shape of sheets or particles spaced apart on the Cu—Zn alloy layer; 80% of the Cu—Zn alloy layer is covered by the surface layer; the thickness of the surface layer is 2.5 $\mu$m; each of the plurality of micropores (including micropores in the surface layer and micropores on the contact area between the surface layer and the Cu—Zn alloy layer; for brevity, the following examples 2-15 will not be repeated) is 0.017-1.25 $\mu$m in diameter; the surface layer comprises 8.4% by mass of CuO, 46.2% by mass of ZnO, 3.6% by mass of $Cu_2(OH)_2CO_3$, and 41.8% by mass of the Cu—Zn intermetallic compound; and the Cu—Zn alloy layer has a thickness of 6 $\mu$m and comprises a $\beta'+\gamma$ phase.

Example 10

A preparation method of the electrode wire, comprising:

1) preparing a brass core comprising $CuZn_{37}$ having a diameter of 0.68 mm;

2) placing the brass core in an electroplating solution comprising saccharide, and forming a zinc coating on the brass core obtained in 1) through an electroplating process; the saccharide comprises at least one selected from the group consisting of sucrose, lactose and maltose; the thickness of the zinc coating is 5.4 $\mu$m; the concentration of the saccharide is 15 g/L; the electrodeposition rate is 320 m/min; the electric current is 988 A; and the electric voltage is 5.68 V.

3) Stretching, using a wire drawing die, the first billet to a diameter of 0.53 mm, so that the zinc coating cracks in a direction perpendicular to the axis of the first billet or at an acute angle of greater than 30 degrees with respect to the axis of the first billet, to yield a second billet comprising the zinc coating with a plurality of cracks.

4) Continuously blowing air to a furnace and heating the second billet in the furnace at 330° C. for 9 hours; cooling the furnace to less than 150° C. and taking the second billet out of the furnace, thus obtaining a third billet comprising an Cu—Zn alloy layer and the zinc coating comprising a plurality of cracks.

5) Stretching, using the wire drawing die, the third billet to a diameter of 0.25 mm, to yield an electrode wire comprising the surface layer and the Cu—Zn alloy layer; the surface layer is in the shape of sheets or particles spaced apart on the Cu—Zn alloy layer; 95% of the Cu—Zn alloy layer is covered by the surface layer; the thickness of the surface layer is 2.9 μm; each of the plurality of micropores (including micropores in the surface layer and micropores on the contact area between the surface layer and the Cu—Zn alloy layer; for brevity, the following examples 2-15 will not be repeated) is 0.036-1.4 μm in diameter; the surface layer comprises 5.9% by mass of CuO, 50.9% by mass of ZnO, 7.1% by mass of $Cu_2(OH)_2CO_3$, and 36.1% by mass of the Cu—Zn intermetallic compound; and the Cu—Zn alloy layer has a thickness of 5.8 μm and comprises a β' phase.

Example 11

A preparation method of the electrode wire, comprising:

1) preparing a brass core comprising $CuZn_{37}$ having a diameter of 0.66 mm;

2) placing the brass core in an electroplating solution comprising saccharide, and forming a zinc coating on the brass core obtained in 1) through an electroplating process; the saccharide comprises at least one selected from the group consisting of sucrose, lactose and maltose; the thickness of the zinc coating is 5.3 μm; the concentration of the saccharide is 12 g/L; the electrodeposition rate is 345 m/min; the electric current is 985 A; and the electric voltage is 5.65 V.

3) Stretching, using a wire drawing die, the first billet to a diameter of 0.51 mm, so that the zinc coating cracks in a direction perpendicular to the axis of the first billet or at an acute angle of greater than 30 degrees with respect to the axis of the first billet, to yield a second billet comprising the zinc coating with a plurality of cracks.

4) Continuously blowing air to a furnace and heating the second billet in the furnace at 280° C. for 6 hours; cooling the furnace to less than 150° C. and taking the second billet out of the furnace, thus obtaining a third billet comprising an Cu—Zn alloy layer and the zinc coating comprising a plurality of cracks.

5) Stretching, using the wire drawing die, the third billet to a diameter of 0.25 mm, to yield an electrode wire comprising the surface layer and the Cu—Zn alloy layer; the surface layer is in the shape of sheets or particles spaced apart on the Cu—Zn alloy layer; 75% of the Cu—Zn alloy layer is covered by the surface layer; the thickness of the surface layer is 2.3 μm; each of the plurality of micropores (including micropores in the surface layer and micropores on the contact area between the surface layer and the Cu—Zn alloy layer; for brevity, the following examples 2-15 will not be repeated) is 0.014-1.22 μm in diameter; the surface layer comprises 8.7% by mass of CuO, 45.7% by mass of ZnO, 3.3% by mass of $Cu_2(OH)_2CO_3$, and 42.3% by mass of the Cu—Zn intermetallic compound; and the Cu—Zn alloy layer has a thickness of 5.5 μm and comprises a β'+γ phase.

Example 12

A preparation method of the electrode wire, comprising:

1) preparing a brass core comprising $CuZn_{37}$ having a diameter of 0.66 mm;

2) placing the brass core in an electroplating solution comprising saccharide, and forming a zinc coating on the brass core obtained in 1) through an electroplating process; the saccharide comprises at least one selected from the group consisting of sucrose, lactose and maltose; the thickness of the zinc coating is 5.2 μm; the concentration of the saccharide is 11 g/L; the electrodeposition rate is 350 m/min; the electric current is 980 A; and the electric voltage is 5.6 V.

3) Stretching, using a wire drawing die, the first billet to a diameter of 0.5 mm, so that the zinc coating cracks in a direction perpendicular to the axis of the first billet or at an acute angle of greater than 30 degrees with respect to the axis of the first billet, to yield a second billet comprising the zinc coating with a plurality of cracks.

4) Continuously blowing air to a furnace and heating the second billet in the furnace at 320° C. for 8 hours; cooling the furnace to less than 150° C. and taking the second billet out of the furnace, thus obtaining a third billet comprising an Cu—Zn alloy layer and the zinc coating comprising a plurality of cracks.

5) Stretching, using the wire drawing die, the third billet to a diameter of 0.25 mm, to yield an electrode wire comprising the surface layer and the Cu—Zn alloy layer; the surface layer is in the shape of sheets or particles spaced apart on the Cu—Zn alloy layer; 89% of the Cu—Zn alloy layer is covered by the surface layer; the thickness of the surface layer is 2.6 μm; each of the plurality of micropores (including micropores in the surface layer and micropores on the contact area between the surface layer and the Cu—Zn alloy layer; for brevity, the following examples 2-15 will not be repeated) is 0.024-1.18 μm in diameter; the surface layer comprises 6.4% by mass of CuO, 50.3% by mass of ZnO, 6.6% by mass of $Cu_2(OH)_2CO_3$, and 36.7% by mass of the Cu—Zn intermetallic compound; and the Cu—Zn alloy layer has a thickness of 5.3 μm and comprises a β' phase.

Example 13

A preparation method of the electrode wire, comprising:

1) preparing a brass core comprising $CuZn_{40}$ having a diameter of 0.65 mm;

2) placing the brass core in an electroplating solution comprising saccharide, and forming a zinc coating on the brass core obtained in 1) through an electroplating process; the saccharide comprises at least one selected from the group consisting of sucrose, lactose and maltose; the thickness of the zinc coating is 5.1 μm; the concentration of the saccharide is 11 g/L; the electrodeposition rate is 360 m/min; the electric current is 975 A; and the electric voltage is 5.55 V.

3) Stretching, using a wire drawing die, the first billet to a diameter of 0.49 mm, so that the zinc coating cracks in a direction perpendicular to the axis of the first billet or at an acute angle of greater than 30 degrees with respect to the axis of the first billet, to yield a second billet comprising the zinc coating with a plurality of cracks.

4) Continuously blowing air to a furnace and heating the second billet in the furnace at 320° C. for 2 hours; cooling the furnace to less than 150° C. and taking the second billet out of the furnace, thus obtaining a third billet comprising an Cu—Zn alloy layer and the zinc coating comprising a plurality of cracks.

5) Stretching, using the wire drawing die, the third billet to a diameter of 0.25 mm, to yield an electrode wire comprising the surface layer and the Cu—Zn alloy layer; the surface layer is in the shape of sheets or particles spaced apart on the Cu—Zn alloy layer; 76% of the Cu—Zn alloy layer is covered by the surface layer; the thickness of the surface layer is 2.2 μm; each of the plurality of micropores (including micropores in the surface layer and micropores on the contact area between the surface layer and the Cu—Zn alloy layer; for brevity, the following examples 2-15 will not be repeated) is 0.015-1.05 μm in diameter; the surface layer comprises 7.8% by mass of CuO, 47.6% by mass of ZnO, 4.5% by mass of $Cu_2(OH)_2CO_3$, and 40.1% by mass of the Cu—Zn intermetallic compound; and the Cu—Zn alloy layer has a thickness of 5.2 μm and comprises a β'+γ phase.

Example 14

A preparation method of the electrode wire, comprising:

1) preparing a brass core comprising $CuZn_{37}$ having a diameter of 0.63 mm;

2) placing the brass core in an electroplating solution comprising saccharide, and forming a zinc coating on the brass core obtained in 1) through an electroplating process; the saccharide comprises at least one selected from the group consisting of sucrose, lactose and maltose; the thickness of the zinc coating is 5 μm; the concentration of the saccharide is 10 g/L; the electrodeposition rate is 385 m/min; the electric current is 970 A; and the electric voltage is 5.5 V.

3) Stretching, using a wire drawing die, the first billet to a diameter of 0.47 mm, so that the zinc coating cracks in a direction perpendicular to the axis of the first billet or at an acute angle of greater than 30 degrees with respect to the axis of the first billet, to yield a second billet comprising the zinc coating with a plurality of cracks.

4) Continuously blowing air to a furnace and heating the second billet in the furnace at 260° C. for 4 hours; cooling the furnace to less than 150° C. and taking the second billet out of the furnace, thus obtaining a third billet comprising an Cu—Zn alloy layer and the zinc coating comprising a plurality of cracks.

5) Stretching, using the wire drawing die, the third billet to a diameter of 0.25 mm, to yield an electrode wire comprising the surface layer and the Cu—Zn alloy layer; the surface layer is in the shape of sheets or particles spaced apart on the Cu—Zn alloy layer; 72% of the Cu—Zn alloy layer is covered by the surface layer; the thickness of the surface layer is 2.1 μm; each of the plurality of micropores (including micropores in the surface layer and micropores on the contact area between the surface layer and the Cu—Zn alloy layer; for brevity, the following examples 2-15 will not be repeated) is 0.012-0.95 μm in diameter; the surface layer comprises 9.2% by mass of CuO, 44.6% by mass of ZnO, 2.7% by mass of $Cu_2(OH)_2CO_3$, and 43.5% by mass of the Cu—Zn intermetallic compound; and the Cu—Zn alloy layer has a thickness of 5 μm and comprises a β'+γ phase.

Example 15

A preparation method of the electrode wire, comprising:

1) preparing a brass core comprising $CuZn_{37}$ having a diameter of 0.6 mm;

2) placing the brass core in an electroplating solution comprising saccharide, and forming a zinc coating on the brass core obtained in 1) through an electroplating process; the saccharide comprises at least one selected from the group consisting of sucrose, lactose and maltose; the thickness of the zinc coating is 4.5 μm; the concentration of the saccharide is 8 g/L; the electrodeposition rate is 400 m/min; the electric current is 965 A; and the electric voltage is 5.2 V.

3) Stretching, using a wire drawing die, the first billet to a diameter of 0.48 mm, so that the zinc coating cracks in a direction perpendicular to the axis of the first billet or at an acute angle of greater than 30 degrees with respect to the axis of the first billet, to yield a second billet comprising the zinc coating with a plurality of cracks.

4) Continuously blowing air to a furnace and heating the second billet in the furnace at 200° C. for 6 hours; cooling the furnace to less than 150° C. and taking the second billet out of the furnace, thus obtaining a third billet comprising an Cu—Zn alloy layer and the zinc coating comprising a plurality of cracks.

5) Stretching, using the wire drawing die, the third billet to a diameter of 0.25 mm, to yield an electrode wire comprising the surface layer and the Cu—Zn alloy layer; the surface layer is in the shape of sheets or particles spaced apart on the Cu—Zn alloy layer; 70% of the Cu—Zn alloy layer is covered by the surface layer; the thickness of the surface layer is 2 μm; each of the plurality of micropores (including micropores in the surface layer and micropores on the contact area between the surface layer and the Cu—Zn alloy layer; for brevity, the following examples 2-15 will not be repeated) is 0.010-0.92 μm in diameter; the surface layer comprises 9.5% by mass of CuO, 44% by mass of ZnO, 2% by mass of $Cu_2(OH)_2CO_3$, and 44.5% by mass of the Cu—Zn intermetallic compound; and the Cu—Zn alloy layer has a thickness of 4 μm and comprises a β'+γ phase.

Comparison Examples 1-5

Comparison example 1: a brass electrode wire having a thickness of 0.25 mm was purchased;

Comparison example 2: a galvanized electrode wire having a thickness of 0.25 mm was purchased in the market;

Comparison example 3: a γ-phase electrode wire having a thickness of 0.25 mm was purchased in the market;

Comparison example 4: a high-speed electrode wire having a thickness of 0.25 mm and comprising a β'+γ phase layer was purchased in the market; and Comparison example 5: a high-speed electrode wire having a thickness of 0.25 mm and comprising a β' phase layer was purchased in the market.

TABLE 1

Process data of Examples 1 to 15

| Example | Diameter of brass core (mm) | Thickness of the zinc coating (μm) | Concentration (g/L) | Electrodeposition rate (m/min) | Electric current (A) | Electric voltage (V) | Diameter of first billet (mm) | Thermal treatment temperature (° C.) | Thermal treatment time (h) |
|---|---|---|---|---|---|---|---|---|---|
| 1 | 0.82 | 6.8 | 25 | 240 | 1200 | 6.2 | 0.6 | 400 | 6 |
| 2 | 0.9 | 9 | 28 | 200 | 1350 | 7 | 0.62 | 400 | 10 |
| 3 | 0.8 | 6.5 | 22 | 250 | 1150 | 6.05 | 0.6 | 320 | 3.5 |
| 4 | 0.8 | 7.8 | 26 | 235 | 1260 | 6.7 | 0.61 | 350 | 10 |
| 5 | 0.78 | 6.3 | 20 | 270 | 1080 | 5.9 | 0.6 | 375 | 5 |
| 6 | 0.76 | 6.1 | 24 | 275 | 1090 | 6 | 0.57 | 330 | 3 |
| 7 | 0.74 | 5.9 | 18 | 280 | 1030 | 5.8 | 0.56 | 300 | 4.5 |
| 8 | 0.72 | 5.8 | 16 | 285 | 1020 | 5.75 | 0.55 | 340 | 8 |
| 9 | 0.7 | 5.5 | 15 | 300 | 990 | 5.7 | 0.53 | 285 | 5.5 |
| 10 | 0.68 | 5.4 | 15 | 320 | 988 | 5.68 | 0.53 | 330 | 9 |
| 11 | 0.66 | 5.3 | 12 | 345 | 985 | 5.65 | 0.51 | 280 | 6 |
| 12 | 0.66 | 5.2 | 11 | 350 | 980 | 5.6 | 0.5 | 320 | 8 |
| 13 | 0.65 | 5.1 | 11 | 360 | 975 | 5.55 | 0.49 | 320 | 2 |
| 14 | 0.63 | 5 | 10 | 385 | 970 | 5.5 | 0.48 | 260 | 4 |
| 15 | 0.6 | 4.5 | 8 | 400 | 965 | 5.2 | 0.47 | 200 | 6 |

TABLE 2

Data of components of surface layer, coverage
of Cu—Zn alloy, and diameter of micropores

| Example | Coverage of Cu—Zn alloy layer by surface layer | Diameter of micropores (μm) | CuO (wt. %) | ZnO (wt. %) | $Cu_2(OH)_2CO_3$ (wt. %) | Cu—Zn intermetallic compound (wt. %) |
|---|---|---|---|---|---|---|
| 1 | 77% | 0.078-1.8 | 4.3% | 53.8% | 9.3% | 32.6% |
| 2 | 80% | 0.080-2.0 | 4.0% | 55.0% | 10.0% | 31.0% |
| 3 | 78% | 0.035-1.6 | 7.2% | 48.7% | 5.1% | 39.0% |
| 4 | 82% | 0.06-1.75 | 5.2% | 51.8% | 7.8% | 35.2% |
| 5 | 85% | 0.05-1.78 | 4.9% | 52.4% | 8.2% | 34.5% |
| 6 | 81% | 0.038-1.65 | 6.8% | 49.6% | 5.8% | 37.8% |
| 7 | 76% | 0.024-1.62 | 8.0% | 46.9% | 4.1% | 41.0% |
| 8 | 86% | 0.042-1.68 | 5.6% | 51.5% | 7.4% | 35.5% |
| 9 | 80% | 0.017-1.25 | 8.4% | 46.2% | 3.6% | 41.8% |
| 10 | 95% | 0.036-1.4 | 5.9% | 50.9% | 7.1% | 36.1% |
| 11 | 75% | 0.014-1.22 | 8.7% | 45.7% | 3.3% | 42.3% |
| 12 | 89% | 0.024-1.18 | 6.4% | 50.3% | 6.6% | 36.7% |
| 13 | 76% | 0.015-1.05 | 7.8% | 47.6% | 4.5% | 40.1% |
| 14 | 72% | 0.012-0.95 | 9.2% | 44.6% | 2.7% | 43.5% |
| 15 | 60% | 0.010-0.92 | 9.5% | 44.0% | 2.0% | 44.5% |

Low-Speed Wire EDM Testing:

Equipment and materials for testing: agieCharmilles CUT E350 machine tool; SKH-9 metallic material; 30 mm thickness workpiece; 6/6 mm square punch; and 0.25 mm electrode wire; the SKH-9 metallic material was cut roughly once and finished four times using a wire cutter.

In comparison to conventional electrode wires, the cutting speed of the electrode wire of the disclosure is increased by 18.69%-27.41% and the surface finish of the workpiece is improved by 20.58%-28.03%.

TABLE 3

Sample electrode wire and processing test data

| | No | Thickness of surface layer | Phase of Cu—Zn alloy layer | Thickness of Cu—Zn alloy layer (μm) | Cutting speed (mm/min) | Improvement of cutting speed (%) | Surface finish of workpiece Ra(μm) | Improvement of surface finish (%) |
|---|---|---|---|---|---|---|---|---|
| Example | 1 | 4 | β' phase | 8 | 3.94 | 22.74 | 0.1556 | 21.69 |
| | 2 | 7 | β' phase | 10 | 4.09 | 27.41 | 0.1568 | 21.09 |
| | 3 | 3 | β' + γ phase | 6.8 | 4.03 | 25.55 | 0.1578 | 20.58 |

TABLE 3-continued

Sample electrode wire and processing test data

| No | Thickness of surface layer | Phase of Cu—Zn alloy layer | Thickness of Cu—Zn alloy layer (μm) | Cutting speed (mm/min) | Improvement of cutting speed (%) | Surface finish of workpiece Ra(μm) | Improvement of surface finish (%) |
|---|---|---|---|---|---|---|---|
|  | 4 | 5.6 | β' phase | 8.3 | 4.07 | 26.79 | 0.1552 | 21.89 |
|  | 5 | 3.5 | β' phase | 6.3 | 3.98 | 22.12 | 0.1526 | 23.20 |
|  | 6 | 3.4 | β' + γ phase | 6 | 3.93 | 22.43 | 0.1514 | 23.80 |
|  | 7 | 2.8 | β' + γ phase | 6.2 | 3.95 | 23.05 | 0.1508 | 24.11 |
|  | 8 | 3.2 | β' phase | 5.9 | 3.96 | 23.36 | 0.1524 | 23.30 |
|  | 9 | 2.5 | β' + γ phase | 6 | 3.87 | 20.56 | 0.1439 | 27.58 |
|  | 10 | 2.9 | β' phase | 5.8 | 3.9 | 21.50 | 0.1483 | 25.36 |
|  | 11 | 2.3 | β' + γ phase | 5.5 | 3.93 | 22.43 | 0.143 | 28.03 |
|  | 12 | 2.6 | β' phase | 5.3 | 3.94 | 22.74 | 0.1475 | 25.77 |
|  | 13 | 2.2 | β' + γ phase | 5.2 | 3.96 | 23.36 | 0.1441 | 27.48 |
|  | 14 | 2.1 | β' + γ phase | 5 | 3.82 | 19 | 0.1482 | 25.42 |
|  | 15 | 2 | β' + γ phase | 4 | 3.81 | 18.69 | 0.1452 | 26.93 |
| Comparison example | 1 | / | / | / | 3.21 | 0 | 0.1987 | 0 |
|  | 2 | / | Zn | 2.5 | 3.25 | 1.25 | 0.1789 | 9.96 |
|  | 3 | / | γ phase | 5 | 3.35 | 4.36 | 0.1824 | 8.20 |
|  | 4 | / | β' + γ phase | 10 | 3.52 | 9.66 | 0.1825 | 8.15 |
|  | 5 | / | β' phase | 12 | 3.48 | 8.41 | 0.1852 | 6.79 |

It will be obvious to those skilled in the art that changes and modifications may be made, and therefore, the aim in the appended claims is to cover all such changes and modifications.

What is claimed is:

1. An electrode wire, comprising:

a brass core;

a Cu—Zn alloy layer coated on the brass core; and a surface layer, the surface layer comprising CuO, ZnO, $Cu_2(OH)_2CO_3$, and a Cu—Zn intermetallic compound; wherein:

the surface layer is in the shape of particles or sheets spaced apart on the Cu—Zn alloy layer; and the Cu—Zn alloy layer is exposed with respect to spaces between the particles or sheets.

2. The electrode wire of claim 1, wherein the surface layer comprises 4%-9.5% by mass of CuO, 44%-55% by mass of ZnO, 2%-10% by mass of $Cu_2(OH)_2CO_3$, and 31%-44.5% by mass of the Cu—Zn intermetallic compound.

3. The electrode wire of claim 1, wherein the surface layer comprises a plurality of micropores each having a diameter of 0.01-2 μm.

4. The electrode wire of claim 1, wherein 60%-95% of the Cu—Zn alloy layer is covered by the surface layer.

5. The electrode wire of claim 1, wherein the surface layer has a thickness ranging from 2 μm to 7 μm.

6. The electrode wire of claim 1, wherein the Cu—Zn alloy layer comprises a β' phase or a β'+γ phase.

7. The electrode wire of claim 1, wherein the Cu—Zn alloy layer has a thickness of 4-10 μm.

* * * * *